Oct. 20, 1959 K. G. JOHNSON 2,909,610

GROUP SELECTOR DEVICE

Filed March 19, 1953 5 Sheets-Sheet 1

INVENTOR
KARL GEORG JOHNSON
BY [signature]
ATTORNEY

Oct. 20, 1959 K. G. JOHNSON 2,909,610

GROUP SELECTOR DEVICE

Filed March 19, 1953 5 Sheets-Sheet 2

INVENTOR
KARL GEORG JOHNSEN
BY Fredrik L. Haus
ATTORNEY

Oct. 20, 1959 K. G. JOHNSON 2,909,610

GROUP SELECTOR DEVICE

Filed March 19, 1953 5 Sheets-Sheet 3

INVENTOR
KARL GEORG JOHNSON
BY [signature]
ATTORNEY

Oct. 20, 1959 K. G. JOHNSON 2,909,610

GROUP SELECTOR DEVICE

Filed March 19, 1953 5 Sheets-Sheet 4

INVENTOR
KARL GEORG JOHNSON
BY [signature]
ATTORNEY

Oct. 20, 1959 | K. G. JOHNSON | 2,909,610

GROUP SELECTOR DEVICE

Filed March 19, 1953 | 5 Sheets-Sheet 5

INVENTOR
KARL GEORG JOHNSON
BY [signature]
ATTORNEY 2,909,610

GROUP SELECTOR DEVICE

Karl Georg Johnson, Stockholm, Sweden, assignor to Telefonaktiebolaget L M Ericsson, Stockholm, Sweden, a corporation of Sweden Application March 19, 1953, Serial No. 343,407
Claims priority, application Sweden March 21, 1952
5 Claims. (Cl. 179—18)

This invention relates to a group selector device intended for automatic telephone exchanges. Known group selectors are arranged for a definite number of traffic routes. If this number is exceeded a further group selector stage must be arranged at least for some of the routes and if the number of routes is smaller than that for which the group selectors are intended, the group selectors will be inadequately utilized. The junction lines are generally provided with a group selector each for incoming calls. According to this invention a group selector device is obtained which is built up by a plurality of small selectors, e.g. operating bars in cross bar switches, which group selector device within wide limits can be adapted to the need of traffic routes.

This is achieved by providing in a telephone system, a plurality of traffic routes each including at least one trunk, said trunks forming groups including trunks from different routes, a separate switch means for each of said trunks, links connectable to said trunks by means of said switch means, the switch means for each group of trunks being connected with the same links and certain of the links in each group being connected with links in other groups, routing means including trunk selecting means and link selecting means and at least one register, means for connecting a calling trunk to said routing means, first relay means responsive to the calling trunk to connect all links selectable by its associated switch means to said link selecting means, and second relay means operated by said routing means for connecting all trunks of a called traffic route to said trunk selecting means, said trunk selecting means and said link selecting means cooperating to select an idle trunk within the called traffic route and an idle link which is available for the calling trunk and also for the selected idle trunk, said routing means connecting said calling trunk and said idle trunk by setting the switch means of the two trunks on the selected idle link.

The invention will be described more in detail in connection with the annexed drawings, Figs. 1–7.

Figure 4:
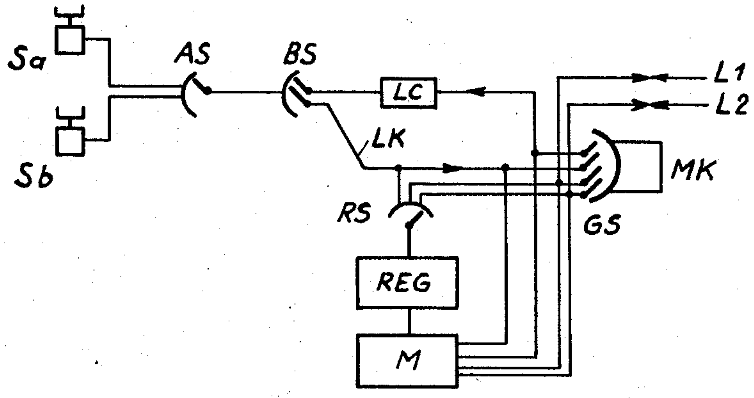

Fig. 4 exemplifies the application of a group selector device according to the invention to a telephone exchange.

Figure 5:
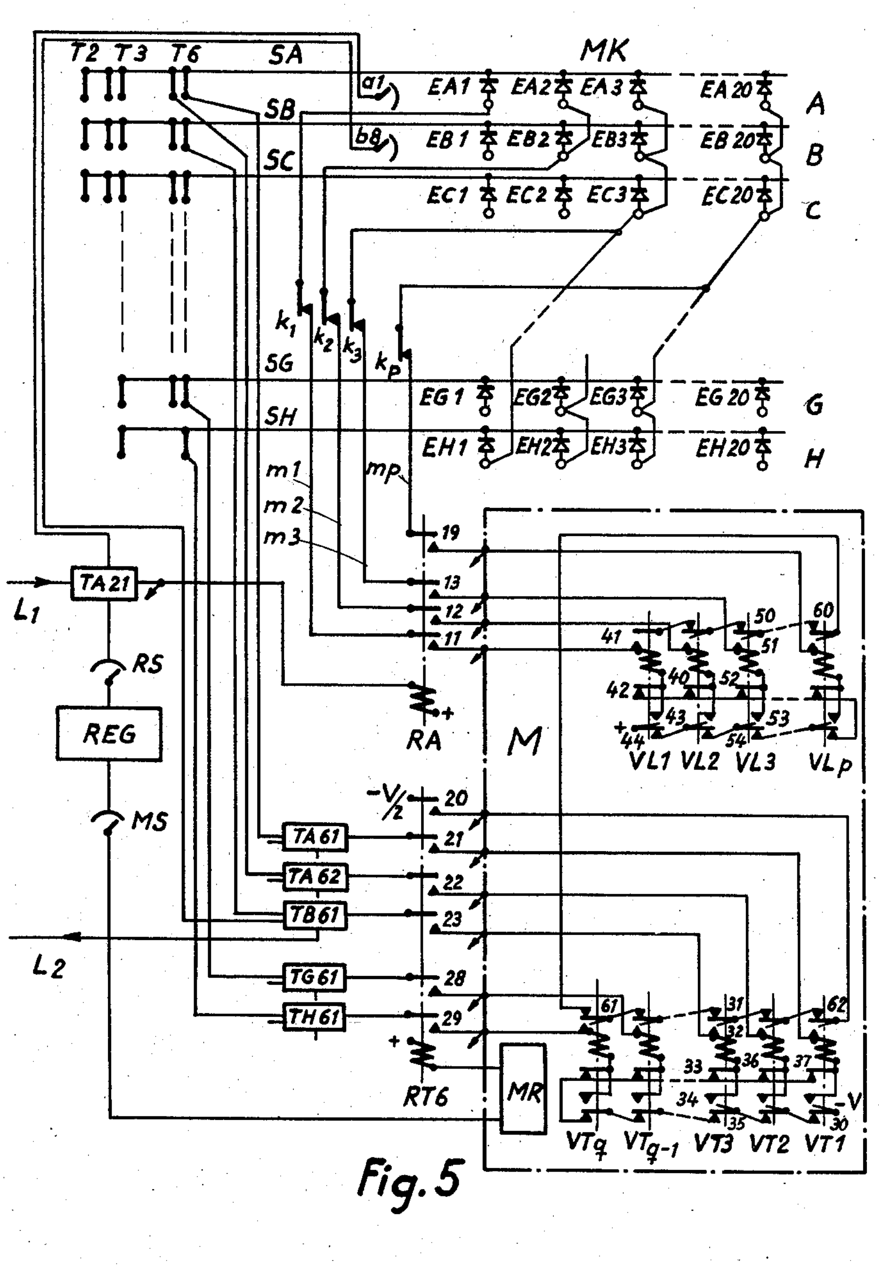

Fig. 5 shows test circuits for simultaneous choice of a free line within a called traffic route and a free link which can set up the communication.

Figure 6:
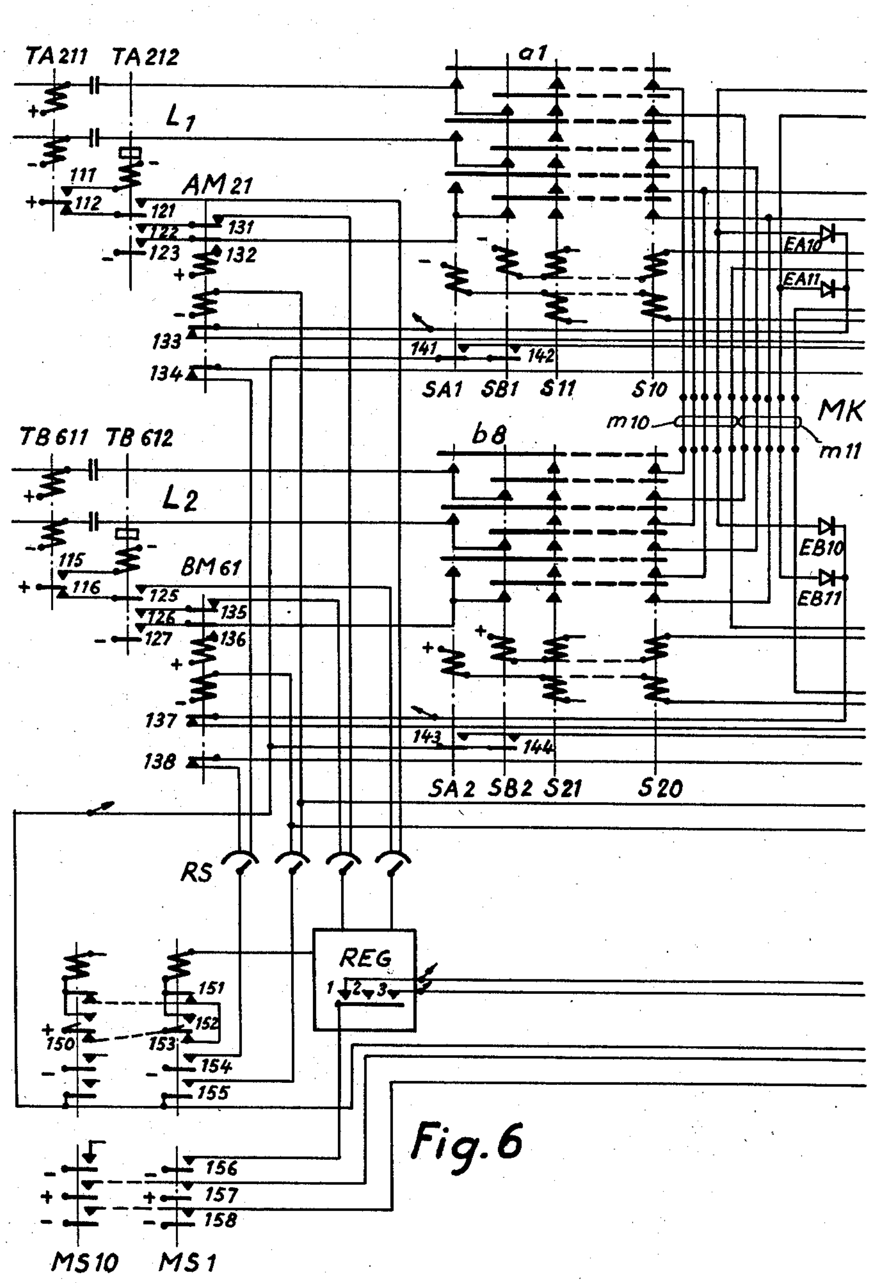
Figure 7:
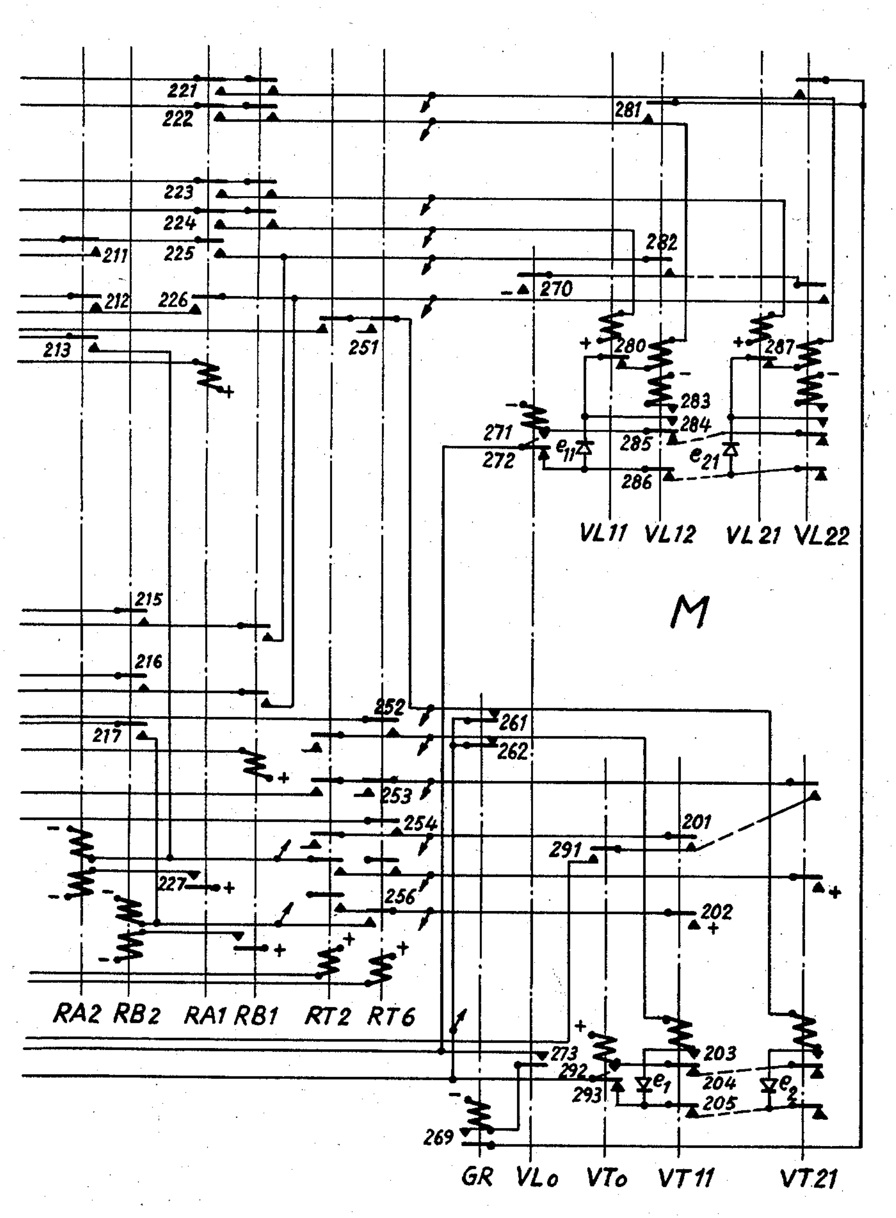

Figs. 6–7 show a detailed switching operation within a group selector device according to an embodiment of the invention with cross bar switches.

Figure 1:
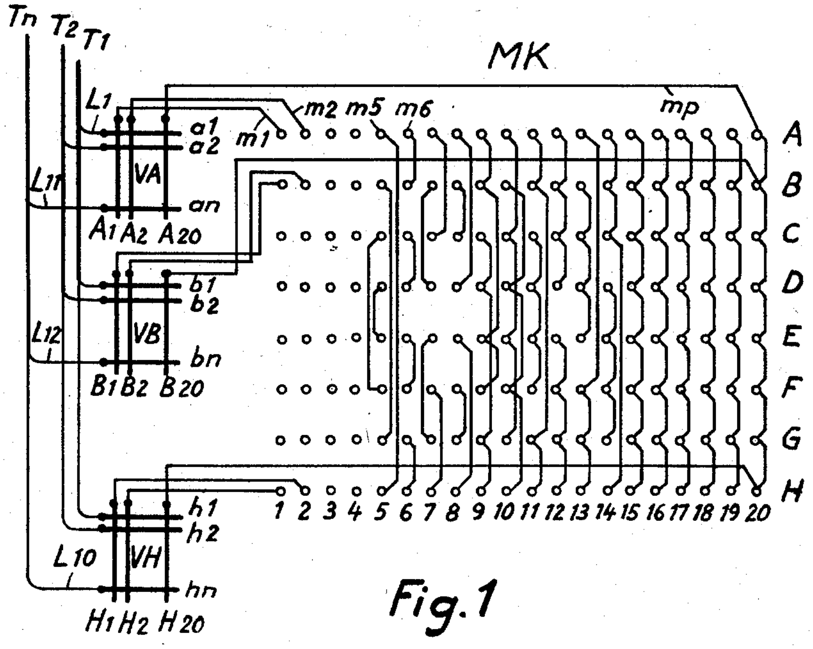
Fig. 1 shows a group selector device according to the invention built up by cross bar switches.

In Fig. 1 T1—T*n* indicates a number of bundles of junction lines. Each line is connected to an operating bar *a*1—*an*, *b*1—*bn* or *h*1—*hn* in a cross bar switch VA—VH in such a way that a line from each grouping of junction lines is to be found in each cross bar switch. Those lines whose operating bars pertain to the same cross bar switch, e.g. VA, or a number of cross bar switches whose selecting bars and multiple contacts have been inter-connected constitute a group of lines with access to the same links, e.g. *m*1—*mp*. To each link *m*1—*mp* there corresponds a selecting bar of a number or inter-connected selecting bars A1—A20.

For a plurality of groups of lines or cross bar switches VA—VH there is a common intermediate frame MK with a row A—H of connecting points 1—20 for each group. To each connecting point there is connected a link. Links from different groups of lines are inter-connected in the intermediate frame MK, e.g. as shown in Fig. 1.

In Fig. 1 the traffic is supposed to be equally distributed over the groups of lines or the cross bar switches VA—VH. The bundles of junction lines T1—T*n* can correspond to a traffic route each or form groups of bundles of junction lines, whereby each group of groupings of junction lines corresponds to a traffic route. Here is supposed that T1 and T*n* pertain to different traffic routes. If a call appears on the line L1 in the bundle T1 and is directed to the traffic route T*n*, at first hand one of the links *m*1—*m*2 and the line L11 are selected. If the line L11 is busy but the line L12 is idle, a link for instance link *m*6 or *mp* which in the intermediate frame MK is included both in row A and row B, is selected and connected to line L12 through operating bar *bn* and a selecting bar, for instance bar B20 in cross bar switch VB. If the line L12 is also busy the line L10 and e.g. the link *m*5 or *mp* are selected at last hand.

Figure 2:
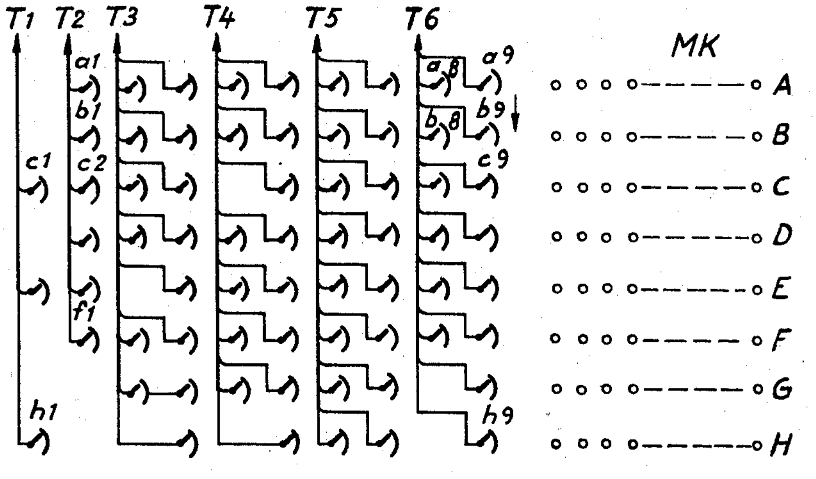
Figs. 2–3 show a group selector device according to the invention built up by selectors of an arbitrary kind. The intermediate frame according to Fig. 3 is performed with particular regard to the fact that the lines in Fig. 2 are selected in sequence.

Fig. 2 shows a group selector stage for 6 traffic routes T1–T6, the lines of which constitute 8 groups A–H. The selectors *a*1—*h*9 may be of arbitrary kind, e.g. rotary selectors with a certain initial position or operating bars in cross bar switches. The selectors *a*1—*a*9 constitute a first group, the lines of which are selected at first hand, the selectors *b*1—*b*9 constitute a second group, the lines of which are selected at second hand and so on. The selectors *h*1—*h*9 constitute the last group, the lines of which are selected at last hand. If the lines are junction lines the lines of the first groups are suitably made single-directed and the lines of the last groups double-directed. Each traffic route can have several lines in each group. The location of the lines within a group is arbitrary although they are combined in the figure in such a way that those which pertain to the same route are shown near to each other. The group selector device may thus be installed successively without changing connections in an already existing switching device.

To each group of lines there belongs a row of connecting places A–H in an intermediate frame MK for links, over which the lines may be connected with each other. The intermediate frame may be wholly adapted to the number of the lines and to the size and character of the traffic.

Figure 3:
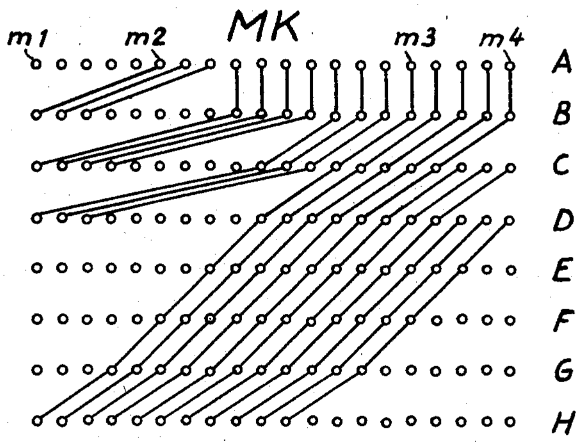

Fig. 3 shows an example of an intermediate frame adapted to Fig. 2, whereby regard is taken to the fact that the lines within the routes are to be selected in sequence, whereby the lines in the group corresponding to the row A are to be selected at first hand and the lines of the group corresponding to the row H are to be selected at last hand if possible. A call e.g. on the line *b*1 directed for instance to the traffic route T6 seeks at first hand communication with the lines corresponding to the selectors *a*8 and *a*9 over one of the first three links of row B in Fig. 3, for instance *m*2, which links are included in both row A and row B. If none of said lines and none of said links are idle, a test is effected if one of the lines corresponding to selectors *b*8 and *b*9 and a local link within row B is idle. Then a link is tested in row C and row B and for instance a line connected to selector C9 is selected if idle and so forth.

As the lines corresponding to the row H are selected at last hand, a local link for communication within the group corresponding to the row H is likely to be found. Such a selector is however not chosen in this example until all common links, which can supply a communication with lines pertaining to the traffic route T6 and corresponds to the rows A—G, have been tested and proved busy or incapable of performing the communication.

Fig. 4 shows the invention applied to an automatic telephone exchange with transit traffic.

In the figure *Sa* and *Sb* are subscriber's apparatuses, AS primary and BS secondary selectors, RS a register finder, REG a register and M a marker. LK and LC are links and L1—L2 are junction lines. The links and lines are connected each to one selector GS in a selector device according to Fig. 2. A calling subscriber's apparatus e.g. *Sa* is connected over a primary selector AS and a secondary selector BS to a link LK, which in its turn is connected over a finder RS to a register REG. If the caller dials the number of the subscriber's apparatus *Sb* the register REG by means of the marker M selects a free link LC which over a link in the intermediate frame MK and the selectors GS pertaining to the links LK and LC may be connected to the subscriber's apparatus *Sb* over a free secondary selector BS and a free primary selector AS. If an outgoing connection is desired the link LK is connected to an outgoing line, e.g. L1 over those selectors GS which pertain to the link LK and the line L1. At a transit connection from the line L1 to the line L2 the line L1 is first connected to the register REG over a finder RS. After the register has received signals from the line L1, which indicate the traffic route, to which the line L2 pertains, the register inter-connects by means of the marker M the lines L1 and L2 over the selectors GS pertaining to them and a link in the intermediate frame MK.

Fig. 5 shows a manner for selecting a free link and a free line for a connection within a group selector device according to Figs. 2–4. In Figure 5 there is shown a junction line L1 pertaining to the traffic route T2 with a line equipment TA21 and a selector *a*1, the multiple of which contains those links *m*1—*mp* which are to be found in the contact row A in the intermediate frame MK, and a junction line L2 pertaining to the traffic route T6 with a line equipment TB61 and a selector *b*8, the multiple of which contains those links *m*2—*mp*, which are to be found in the contact row B. For each group of lines there is a conductor SA or SB . . . SH and a rectifier $EA_1$—$EA_{20}$, $EB_1$—$EB_{20}$ . . . $EH_1$—$EA_{20}$, for each link, which can be reached by the selectors in the group. For each group of lines there is furthermore a connecting relay, e.g. RA and for each traffic route a connecting relay, e.g. RT6 for connecting marking wires to selecting relays VL1—VL*p* and VT1—VT*q* in the marker M. For each link *m*1—*mp* there are devices for marking if the link is free or busy, viz. in this case a contact $k_1$—$k_p$, which is actuated by a particular relay per link and is closed, when the link is free.

When a call comes in on the line L1 the line equipment TA21 is connected over the finder RS to the register REG, which is set by means of signals from the lines. After the register has been set, it is connected over the finder MS to the marker M and a relay set MR in the marker receives signals from the register REG, which indicate a traffic route, e.g. T6 in Fig. 2. When the marker M is busy, a circuit for the relay RA is closed and, when the relay set MR has been set, the relay RT6 is operated. The contacts 11—19 and 20—29 are actuated. The following circuits are completed if all links and lines are free:

(*a*) +, contact 44, break contacts on the relays VL2—VL*p*, contact 42, winding on relay VL1, contacts 11 and *k*1, rectifier EA1, wire SA, contact in the line equipments TA61 and TA62 indicating if the corresponding lines are free or busy, contact 21 or 22, winding on relay VT1 or VT2, contact 36 or 37, series-connected break contacts on the relays VT1—VT*q* to —V, which is the minus pole of the exchange battery.

(*b*) +, contact 44 and others, winding on relay VL2, contacts 12 and *k*2, rectifier EA2 or EB1, wire SA or SB, the line equipments TA61, TA62 or TB61, contact 21, 22 or 23, winding on relay VT1, VT2 or VT3, contact 37, 36 or 33, to —V over the contact 30 and others.

(*c*) +, contact 44 and others, winding on relay VL3, contacts 13 and *k*3, rectifier EA3, EB3 or EG3, wire SA, SB or SC, line equipment TA61, TA62, TB61 and others, contact 21, 22, 23 and others, relay VT1, VT2, VT3 and others, contact 37, 36, 33 and others, to —V over contact 30 and others.

(*d*) +, contact 44 and others, winding on relay VL*p*, contacts 19 and *kp*, rectifier EA20, EB20, EC20 . . . EG3 or EH3, wire SA, SB, SC . . . SG or SH, line equipment TA61, TA62, TB61 . . . TG61 or TH61, contact 21, 22, 23 . . . 28, or 29, winding on relay VT1, VT2, VT3 . . . $VT_{q-1}$, or $VT_q$, contact 37, 36, 33 and corresponding to —V over contact 30 and others.

Here is supposed that the lines corresponding to the line equipments TA61 and TA62 are busy and the link *m*2 is busy, whereby the contact *k*2 is broken. The relays VT3 attract their armatures. Contacts 50—54 and 31—35 are actuated, the link *m*3 and the line L2 having been selected thereby.

If all links but the link *m*3 are busy the relay VL3 will first attract, and then the following circuits are completed: +, contacts 44, —53, winding on relay VL3, contact 51 . . . 60, 61, —31, —62 and 20 to —V/2, which is a centralizer tapping of the exchange battery, and —V/2, contacts 20, 62—, 31—62, 61, 60, 51, 13, *k*3, rectifier EB3, line equipment TB61, contact 23, winding on relay VT3, contacts 33—35—30 to —V. The relay VT3 attracts its armature as above.

Suppose there are links, all lines of the route T6, however, but the line L2 being busy, the relay VT3 will first attract and the following circuit is completed for the relay VL2: +, contacts 44 —54, —40, winding on relay VL2, contacts 12 and *k*2, rectifier EB2, wire SB, line equipment TB61 contact 23, 32—62 and 20, to —V/2.

Figs. 6–7 show a detailed switching operation at interconnection of two lines L1 and L2. To the line L1 there pertain the relays TA211 and TA212 and the operating bar *a*1 in a cross bar switch with the selecting magnets SA1, SB1, S11—S10. The operating bar *a*1 has an operating magnet AM21. To the line L2 there pertain the relays TB611 and TB612, the operating bar *b*8 in a cross bar switch with selecting magnets SA2, SB2, S21—S20 and the operating magnet BM61. An intermediate frame MK with two links *m*10 and *m*11 is shown in Fig. 6. Fig. 7 shows a marker M with selecting relays VL11—VL22 for selection of links and selecting relays VT11—VT21 for selection of a free line, marking relays RT2 and RT6 for two traffic routes and connecting relays RA1—RA2 and RB1—RB2. There are furthermore auxiliary relays GR, VL*o* and VT*o* in the marker M. The lines L1 and L2 are connected to the operating bars *a*1 and *b*8 over condensers. REG in Fig. 6 is a register with a finder RS and a relay MS1 for connection of the register to the marker M. The relay MR1 pertains to a relay chain MS1—MS10, in which only one relay at a time can be actuated and which contains a relay for each of a plurality of registers. A call on the line L1 causes that the relay TA211 attracts its armature. The contacts 111—112 are actuated. The relay TA212 attracts its armature. The contacts 121—123 are actuated. By means of relays and circuits, which are not shown on the drawing, because they are completely unessential for the invention, the finder RS is set so that the register REG is energized over the contact 122 and 131 and receives impulses from the relay TA211 in a circuit over the contacts 112 and 121. Said impulses set the register REG, whereby one of the contacts 1—3 in the register is closed. Then the register closes a circuit for the relay MS1 over the contacts 150—153 and 151. The relay MS1 attracts its armature and the contacts 151—158 are actuated.

If that traffic route, to which the line L2 pertains, is called, the contact 3 of the register REG is closed. The relay RT6 is energized over the contacts 156 and 3 and attracts its armature. The contacts 251—256 are closed, whereby the line L2 and others are connected to the selecting relays VT11—VT21. At the same time the relay RA1 attracts its armature in a circuit over the contact 134, the finder RS and the contact 154. The contacts 221—227 are actuated, whereby those links *m*10—*m*11 and others, which may be reached by the selector *a*1, are connected to the selecting relays VL11—VL22. The relay RA2 is energized over the contact 227 and actuates the contacts 211—213. The following test circuits are completed if the links *m*10—*m*11 are free:

(*a*) +, contacts 157 and 272, rectifier *e*11, contacts 280, the upper winding of the relay VL12, contact 222, rectifier EB11, contacts 137, 252 and 262, to minus over the contact 158.

(*b*) +, contacts 157, 272 and 286 and others, rectifier *e*21, contact 287, the upper winding of the relay VL22, contact 221, rectifier EB10, contacts 133, 252, 262 and 158, to minus.

The relay VL12 attracts its armature. The contacts 281—286 are actuated. The circuit of the relay VL22 is broken by the contact 286. The relay VL*o* attracts its armature in the following circuit: +, contacts 157 and 272, rectifier *e*11, contact 284, winding on relay VL*o*, to minus. Contacts 270—273 are actuated. The relay VL*o* is kept energized over the contact 271 and the relay VL12 is energized through its lower winding over the contacts 271, 284, and 283. The relay GR is energized over the contacts 157 and 273 and actuates the contacts 261—269. The following circuit is completed if the line L2 is free: +, contacts 157, 273, 269, 281, 222, rectifier EB11, contacts 137 and 252, winding on relay VT11, rectifier *e*1, contacts 293 and 158, to minus. The relay VT11 attracts its armature. The contacts 201—205 are actuated. The relay VT*o* is energized over the contact 203, rectifier *e*1, contact 293 and 158 to minus. The contacts 291—293 are actuated. The relay VT*o* is energized over the contact 292 and the relay VT11 is kept energized over the contacts 292 and 203. The relay RB2 is energized over the contacts 202 and 256 through its upper winding. The contacts 215—217 are closed.

Thus the link *m*11 and the line L2 have been selected and the selecting and operating magnets of cross bar switches are to be operated. The selecting magnets of the link *m*11 are operated in the following circuits: +, winding on selecting magnet SB1 or SB2, the upper winding of the selecting magnet S10 or S20, contact 225, or contacts 215, 211 and 225, contacts 282 and 270 to minus. The selecting magnets SB1, SB2, S10 and S20 attract their armatures. The contacts 142 and 144 are actuated. The following circuits are completed when the contact 144 is actuated: +, contacts 202, 256, 217, 144 and 155, finder RS and the lower winding of the operating magnet AM21, or the contacts 291, 201, 254 and the lower winding of the operating magnet BM61, to minus. The operating magnets AM21 and BM61 attract their armatures. The contacts 131—134 and 135—138 are actuated. The spring sets in the operating bars for cross bar switches *a*1 and *b*8 corresponding to the selecting magnets SB1, SB2, S10 and S20 are actuated. The operating magnet AM21 is then kept operated through its upper winding over the contacts 123 and 132. The operating magnet BM61 is operated over contacts 123, the lower contact strip of the operating bar *a*1, the link *m*11, the lower contact strip of the operating bar *b*8, contact 136, the upper winding of the operating magnet BM61, to +.

The contacts 131 release the register REG, the relay MS1 releases its armature and the marker M is released. The lines L1 and L2 are then inter-connected over the link *m*11.

If during the switching operation described above the link *m*11 had been busy the relay VL12 had been broken by the relay VL11 due to the following circuit: +, winding on relay VL11, contact 224, the lower contact strip of that operating bar which keeps the link *m*11 busy e.g. the operating bar *a*1, to minus over the contact 123. The relay VL11 actuates the contact 280 and another link, e.g. *m*10 is selected by the relay VL22 attracting its armature. As appears from Figs. 6–7 the lines L1—L2 are completely equally arranged and a call from the line L2 to the line L1 occurs analogously with the description above. Instead of the relay RT6 the relay RT2 is operated and instead of the relay RA1 the relay RB1 is operated.

I claim:

1. In a telephone system, a plurality of traffic routes each including at least two trunks, said trunks forming groups including trunks from different routes, switch means interconnected with each trunk in said traffic routes, links connected to said switch means, the switch means for each group of trunks being connected with the same links and certain of said links in each group being connected with links in other groups, marking means including trunk selecting means and link selecting means, a register, means for connecting a calling trunk to said register and means connecting said register to said marker, first relay means responsive to the calling trunk to connect all links selectable by its associated switch means to said link selecting means, second relay means operated by said marker for connecting all trunks of a traffic route to said trunk selecting means, said trunk selecting means functioning to select an idle trunk in one of said groups, said link selecting means selecting an idle link connectable to the selected and calling trunks and said marking means connecting the idle and calling trunks by setting the switch means of said trunks on the selected link.

2. In a telephone system according to claim 1, a rectifier associated with each link, a test conductor for each trunk, a second test conductor for each link connected to one rectifier in each group of trunks available for one link, all of said test conductors and rectifiers within a group being interconnected, a first set of test relays associated with said trunk selecting means, a second set of test relays connected with said link selecting means and said first and second relay means, and testing circuits joining said sets of relays for selecting the idle trunk and link to be interconnected with said calling trunk.

3. In a telephone system, a plurality of traffic routes each including at least one trunk, said trunks forming groups including trunks from different routes, a separate switch means for each of said trunks, links connectable to said trunks by means of said switch means, the switch means for each group of trunks being connected with the same links and certain of the links in each group being connected with links in other groups, routing means including trunk selecting means and link selecting means and at least one register, means for connecting a calling trunk to said routing means, first relay means responsive to the calling trunk to connect all links selectable by its associated switch means to said link selecting means, and second relay means operated by said routing means for connecting all trunks of a called traffic route to said trunk selecting means, said trunk selecting means and said link selecting means cooperating to select an idle trunk within the called traffic route and an idle link which is available for the calling trunk and also for the selected idle trunk, said routing means connecting said calling trunk and said idle trunk by setting the switch means of the two trunks on the selected idle link.

4. In a telephone system, a plurality of traffic routes (T2, T3, T6) each including a plurality of trunks (L1, L2 and other trunks connected to TA61—TH61), said trunks forming groups (A—H) including trunks from different routes, switch means ( *a*1, *b*8 and other switches connected to TA61—TH61) interconnected with each trunk in said traffic routes, links (*m*1—*mp*) connectable to said trunks by said switch means, the switch means for each group of trunks being connected with the same links and certain of said links in each group being connected with links in other groups, a marker (M) including trunk selecting means (VT1—VT*q*) and link selecting means (VL1—VL*p*), both said selecting means being arranged for selection in a consecutive order, a register (REG), means (RS) for connecting a calling trunk to said register, means (MS) connecting said register to said marker, first relay means (RA) responsive to the calling trunk to connect all links selectable by its associated switch means to said link selecting means, and second relay means (RT6) operated by said marker under control of said register for connecting all trunks of a called traffic route to said trunk selecting means, said trunk selecting means and said link selecting means cooperating to select the first idle trunk in a predetermined order within the called traffic route and the first idle link in a predetermined order for the group of links in which the calling trunk is included, which idle link constitutes a connecting path between the calling trunk and the selected idle trunk, and said marker connecting said idle trunk and said calling trunk by setting the switch means of the two trunks on the selected idle link.

5. In a telephone system as described in claim 4, a number of rectifiers (EA1—EA20) for each of said groups of trunks, one rectifier for each link (*m*1—*mp*) which over said switch means is connectable to the trunks (TA61—TA62) of the group, a test conductor for each trunk, a test conductor for each link connected to one of said rectifiers in each of said groups in which the link is included, said rectifiers and said test conductors for trunks within a group being interconnected, a first set of test relays constituting said trunk selecting means, a second set of test relays constituting said link selecting means, and test circuits closable by said first and second relay means (RA, RT6), said test circuits including said test conductors and rectifiers, one test relay in said first and said second set of test relays operating for selecting the idle trunk and link which are to be interconnected with said calling trunk.

References Cited in the file of this patent

UNITED STATES PATENTS

| | | |
|---|---|---|
| 1,821,998 | Wright | Sept. 8, 1931 |
| 1,972,199 | Merk | Sept. 4, 1934 |
| 2,400,530 | Bellamy | May 21, 1946 |
| 2,541,624 | Voss | Feb. 13, 1951 |
| 2,546,998 | Gohorel | Apr. 3, 1951 |
| 2,575,882 | Lundkvist | Nov. 20, 1951 |
| 2,629,019 | Lesigne | Feb. 7, 1953 |